US011884246B1

(12) United States Patent
Jankowski

(10) Patent No.: US 11,884,246 B1
(45) Date of Patent: Jan. 30, 2024

(54) SWING AWAY HITCH

(71) Applicant: Mark A Jankowski, Greenwood Village, CO (US)

(72) Inventor: Mark A Jankowski, Greenwood Village, CO (US)

( * ) Notice: Subject to any disclaimer, the term of this patent is extended or adjusted under 35 U.S.C. 154(b) by 35 days.

(21) Appl. No.: 17/494,990

(22) Filed: Oct. 6, 2021

(51) Int. Cl.
*B60R 9/10* (2006.01)
*B62D 43/02* (2006.01)

(52) U.S. Cl.
CPC ............... *B60R 9/10* (2013.01); *B62D 43/02* (2013.01)

(58) Field of Classification Search
CPC .................................. B60R 9/10; B62D 43/02
USPC ............................................................. 224/924
See application file for complete search history.

(56) References Cited

U.S. PATENT DOCUMENTS

| | | | | |
|---|---|---|---|---|
| 4,948,021 A * | 8/1990 | Murphy | ................. | B62D 43/02 224/532 |
| 5,137,192 A * | 8/1992 | Sheridan | ................. | B62D 43/02 224/924 |
| 5,228,606 A * | 7/1993 | Hickson | .................... | B60R 9/06 224/555 |
| 5,579,972 A * | 12/1996 | Despain | .................... | B60R 9/06 224/521 |
| 6,910,669 B2 * | 6/2005 | Gates | ..................... | B62D 43/02 403/301 |
| 8,387,839 B2 * | 3/2013 | Sautter | ..................... | B60R 9/10 224/532 |
| 9,102,280 B1 * | 8/2015 | Crawford | .................. | B60R 9/10 |
| 9,333,822 B1 * | 5/2016 | LaFave | ..................... | B60R 9/06 |

* cited by examiner

*Primary Examiner* — Scott T McNurlen

(74) *Attorney, Agent, or Firm* — GUGLIOTTA & GUGLIOTTA LPA

(57) ABSTRACT

A spare tire mounted, swing way bike rack is provided having a upper receiver attachment and a lower receiver attachment are supported on upper and lower adjustment bars, respectively, and are a similar standard size as otherwise conventional hitch receives. Both secondary mounting points allow aftermarket accessories of those design to affix to a conventionally sized hitch receiver to be attached thereto in a manner that allows those attachment to swing with the vehicles rear door.

11 Claims, 4 Drawing Sheets

SWING AWAY HITCH

RELATED APPLICATIONS

There are no previously filed, nor currently any co-pending applications, anywhere in the world.

BACKGROUND OF THE INVENTION

1. Field of the Invention

The present invention relates generally to the field of vehicle mounted bike carrier systems and, more specifically, to a swing-away bike carrier system.

2. Description of the Related Art

A bicycle carrier, also commonly called a bike rack, is a device attached to an automobile for transporting bicycles. Automobile mounted bike carriers can be attached to the roof, rear trunk, or rear tow hitch, depending on the vehicle.

Jeep is an automobile marque in the United States that sells, inter alia, off-road capable sport utility vehicles (SUV), one of which is Jeep® Wrangler®. The type of passenger automobiles consisting of highway-legal vehicles having off-road enhanced performance. Similar to the Willys MB and the CJ Jeeps before it, all Wrangler models continue to use a separate body and frame, rigid live axles both front and rear, a tapering nose design with flared fenders, a fold-flat windshield, and can be driven without doors. Also, with few exceptions, have as standard equipment open bodies with removable hard- or soft-tops.

Unlike most passenger vehicles, the Wrangler® has a fairly unique configuration in which the roof panels are generally convertible or have limited connection points, and the spare tire is mounted to an outside surface of a hinged rear door. As a result, the only conventional type of bike carriers cannot be attached to the roof or rear trunk, and must be mounted to a rear tow hitch. However, with a tow-hitch mounted pike rack in position, neither the spare tire nor the rear door panel is freely accessible.

Some methods and devices are known that incorporate various mechanisms for providing pivotal supports for attachment to a vehicle. For example number of references were directed to swing out racks that connect to a standard receiver mount. Exemplary of these include: U.S. Pat. No. 5,303,857, issued in the name of Hewson; U.S. Pat. No. 9,475,353, issued in the name of Mehlen; U.S. Pat. No. 5,544,799, issued in the name of Didlake; and U.S. Pat. No. 5,664,717 issued in the name of Joder. Each of these shows swing out bike rack devices; yet all affix to the hitch receiver and none are mounted to and work in conjunction with an exterior mounted spare tire.

Several other references were directed to swing-out devices for holding a spare tire. Exemplary of these are: U.S. Patent Application Publication 2013/0221042, published in the name of Fortner, discloses a receiver mounter spare tire hitch system; and U.S. Pat. No. 6,607,346, issue din the name of Dunsch et al, in which a spare wheel holding device is provided that swings away from the tailgate of the vehicle but is not affixed to a standard receiver hitch.

Finally, those most relevant references which relate in some way to a combination tire holder and bike rack, are the following.

U.S. Pat. No. 4,561,575, issued in the name of Jones, discloses a swing away tire carrier and hitch or secure mounting on one end of a vehicle and an elongated arm has a first end thereof provided with support structure for supporting a vehicle wheel therefrom with the medial plan of the wheel generally paralleling the arm. Mounting structure is also provided for mounting the second end of the arm from the mount for angular displacement relative thereto about a first horizontal axis generally normal to the aforementioned plane between a raised upright position with the first end of the arm uppermost and a generally horizontal position with the arm first end swung downwardly to a horizontal position. The mounting structure also mounts the second arm end for swinging relative to the mount about an upright axis, whereby the wheel supporting arm may first be swung across the associated vehicle end from an upright position to a horizontal position and then may be swung outwardly from the corresponding vehicle end.

U.S. Pat. No. 4,948,021, issued in the name of Murphy et al., disclose a spare-tire mount bicycle rack comprising a pedestal mountable on lug bolts of an exterior spare-tire mount including spokes which extend axially to the lug bolts. A main support arm extending laterally to the spokes is attachable to outer ends of the spokes by means of an outer hub and has mounted on it a bicycle support arm for supporting a bicycle laterally of the spare-tire mount. First and second angularly adjustable mounting mechanisms allow the angular positions of the main support arm relative to the outer hub and the bicycle support arm relative to the main support arm to be adjusted respectively.

And, U.S. Pat. No. 10,858,050, issued in the name of Headlee, discloses a wing away support assembly for spare tire carrier that can be installed on a tailgate of a vehicle, such as on a bumper and/or rear panel of the vehicle. The swing away support assembly can provide additional structural support for spare tires and/or other heavy mounted objects. Advantageously, the swing away support assembly is compatible with existing spare tire carriers, backup cameras, and rear lights.

Consequently, none of these existing solutions are particularly adapted to the problem being solved herein, namely, providing a bike rack system that is mountable to a Jeep® Wragler® vehicle that does not interfere with the operation of the rear door panel or access to the spare tire.

SUMMARY OF THE INVENTION

It is thus an object of the present invention to provide a swing-away bike carrier system.

It is a feature of the present invention to provide a swing-away bike carrier system that is mountable to a Jeep® Wragler® vehicle that does not interfere with the operation of the rear door panel or access to the spare tire.

The present invention provides a swing away hitch assembly consists essentially of an upper mounting plate, a lower mounting plate and a connection assembly securing the two. The mounting plates affixed to the stock mounting points on the rear of the vehicle and secures between beneath the spare tire (for the upper mounting plate) and the spare tire mount (for the lower mounting plate). The connection between the upper mounting plate and the lower mounting plate includes an upper adjustment arm and a lower adjustment arm mechanically affixed together by a connecting bar. An upper receiver attachment and a lower receiver attachment are supported on the upper and lower adjustment bars, and are a similar standard size as otherwise conventional hitch receives.

The upper hitch receiver can receive a tray, cooler or other The lower hitch received can receive a similar accessory, or additionally a bike carrier of the type that would normally be affixed to the vehicles stock hitch receiver. Both secondary mounting points allow aftermarket accessories of those design to affix to a conventionally sized hitch receiver to be attached thereto in a manner that allows those attachment to swing with the vehicles rear door.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Figure 1A:
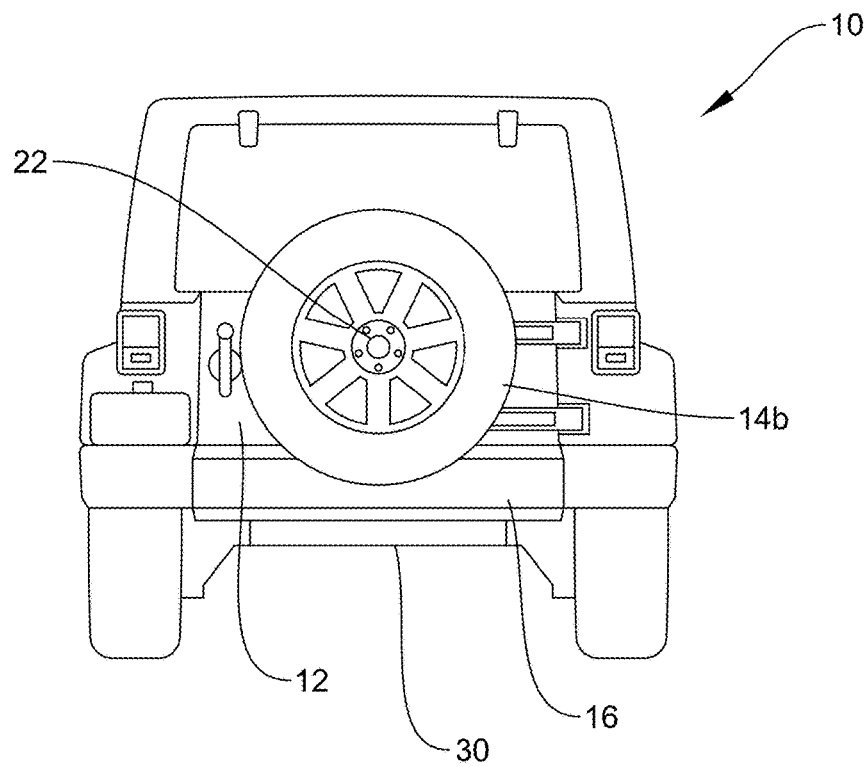
FIG. 1A depicts a rear view of a Jeep® SUV vehicle according to the PRIOR ART.
Figure 1B:
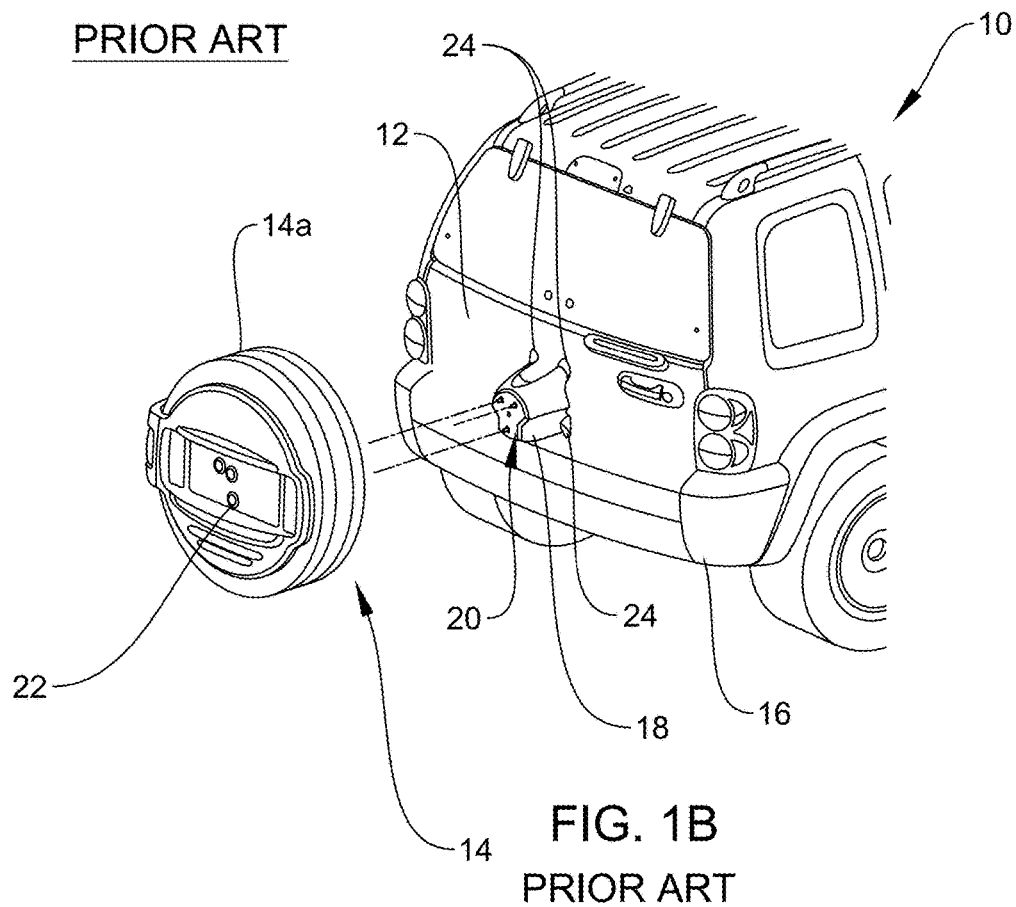
FIG. 1B is a partial exploded perspective view thereof showing the attachment of the spare tire carrier according to the PRIOR ART.

Referring now to FIG. 1A and FIG. 1B, rear view of a Jeep® SUV vehicle, generally noted as 10, is shown according to the PRIOR ART. Such a vehicle model exemplary has a hinged rear door 12 for accessing the rear interior of the vehicle 10. Such a vehicle model further includes a spare tire carrier 14 that is externally mounted to the outer surface of the rear door 12. The tire carrier may be of an enclosure style 14a that contains the tire, or the tire itself 14b may be mounted directly without the enclosure. For purposes of the present invention the terms tire, spare tire, and tire carrier should be broadly construed as interchangeable and to include all reasonable functional equivalent rear-door-mounted structures. The tire 14a or tire carrier 14 may generally be positioned above a lower bumper 16. A mounting bracket 18 may further be provided as a connection between the rear door 12 and the tire carrier 14. The mounting bracket 18 will provide, generally, a distally offset outer mounting surface 20 to which the tire 14a is affixed, generally with a bolt or threaded fastener 22. The base of the mounting bracket 18 is also affixed to the outer surface of the rear door 12 using additional threaded fasteners 24.

Additionally provided as standard, OEM or aftermarket equipment with such models of Jeep® SUV vehicle are a receiver type trailer hitch 30. Such a tow hitch 30 is attached to the chassis of the vehicle for towing a trailer or other carrier attachment. As shown herein a typical trailer hitch is shown a Class IV type receiver that typically bolts to the chassis of the vehicle and comprises a receiver tube 30. As should be apparent to one having ordinary skill in the relevant art, such trailer hitch receiver tubes may be provided in one of various sizes depending on the load they carry and the country of operation, with Class I and Class II hitches having a 1¼ inch (31.8 mm) receiver tube, Class III and Class IV hitches having a 2 inch (50.8 mm) receiver tube, and a Class V hitch having a 2 or 2½ inch (50.8 mm or 63.5 mm) receiver tube. According to the present invention the teachings and function should not be limited to any specific size of vehicle mounted received, and should be broadly construed to work in conjunction with any of these options or any functional equivalent.

With such models of Jeep® SUV vehicles provided with a receiver 30 at or below the bumper, there are a number of currently available bike racks that can and will mount into the receiver tube 32. As indicated above and as can be seen from the PRIOR ART, the attachment of a bike carrier within the stock hitch receiver 30 will function adequately in carrying bikes or other light weight storage attachments. However, while attached such a bike carrier will interfere with the operation of the read door 12. To overcome such a constraint, the present invention provides a secondary attachment receiver in a manner that mounts to the rear door 12 or distally offset outer mounting surface 20 in a manner that allows whatever is attached thereto to move along with the pivoting of the rear door 12.

Figure 2:
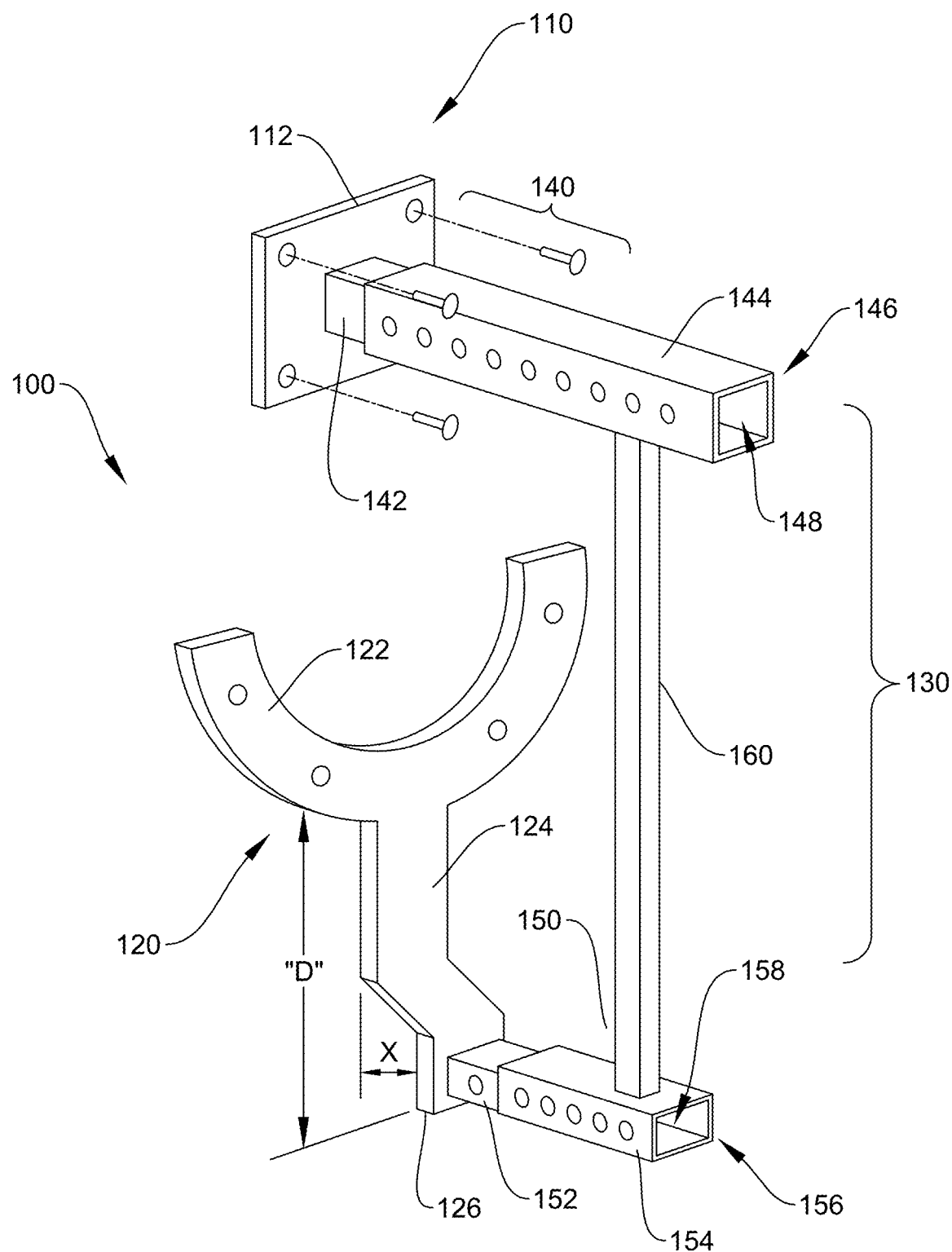
FIG. 2 is a perspective view of a swing away hitch assembly in accordance with a preferred embodiment of the present invention.
Figure 3:
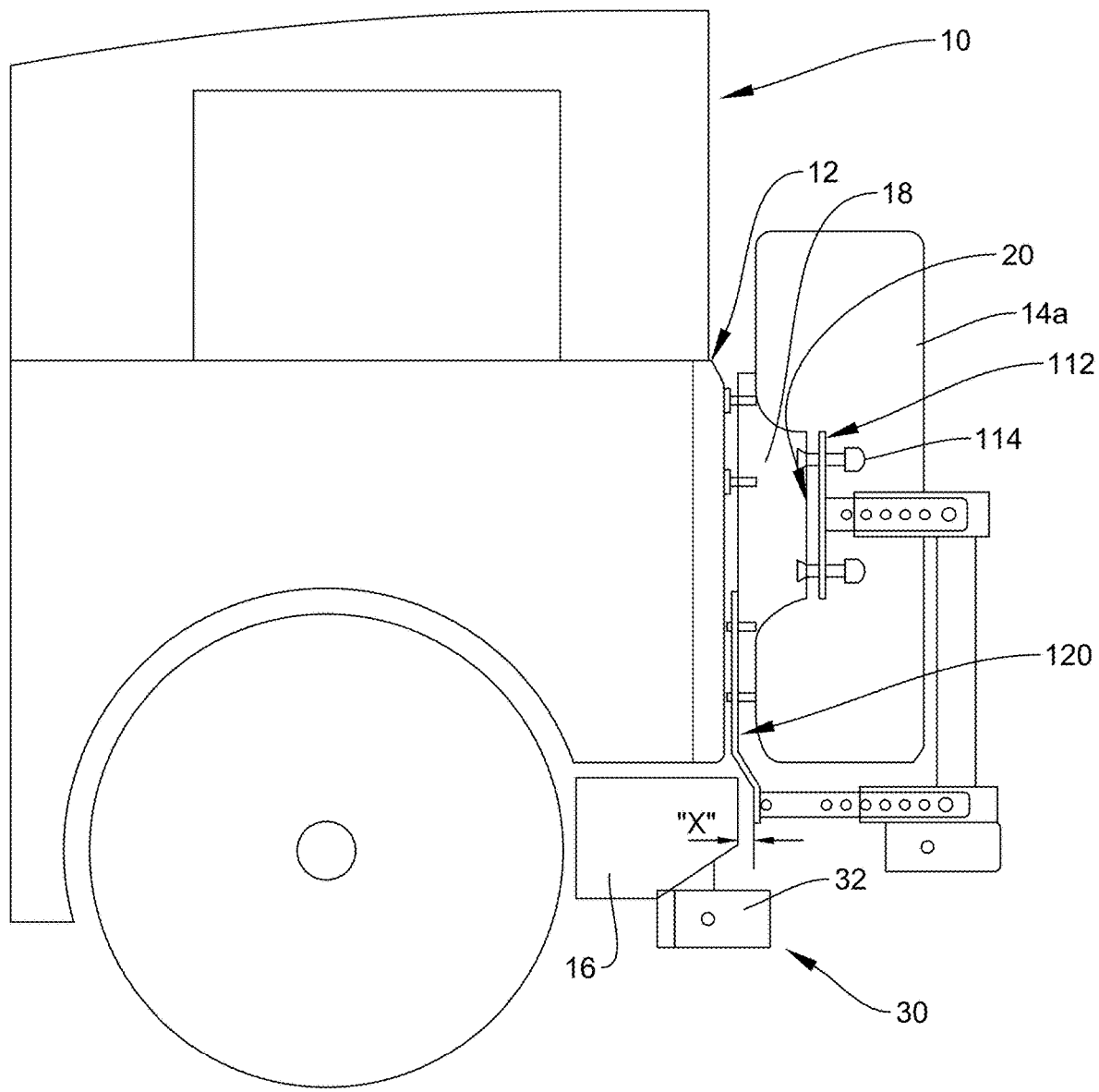
FIG. 3 is a schematic rear elevational view thereof, shown affixed to a rear of a Jeep® SUV vehicle.
Figure 4:
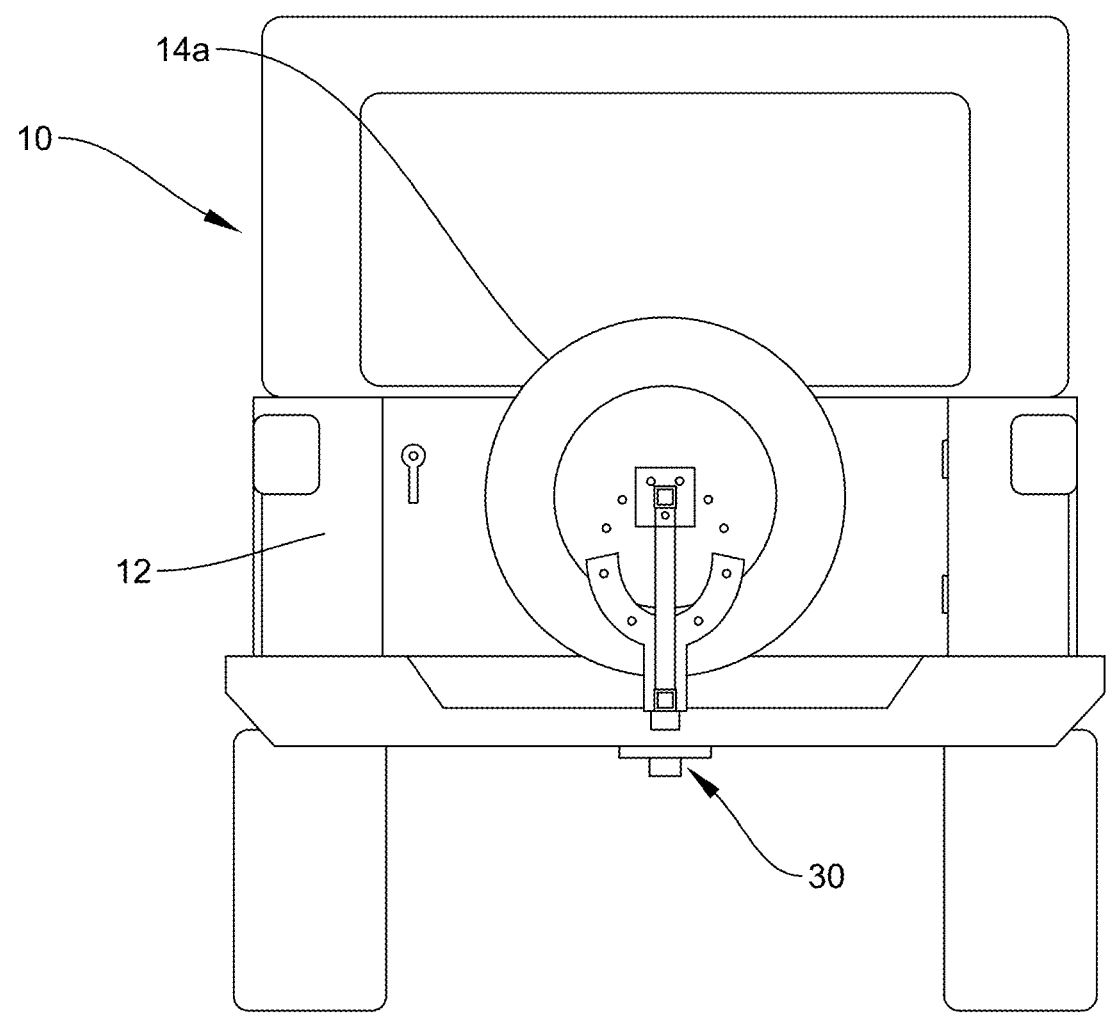
FIG. 4 is a schematic side elevational view thereof.

As shown in FIG. 2 through FIG. 4, wherein like reference numerals indicate the same parts throughout the several views, a swing away hitch assembly, generally noted as 100, is shown in accordance with a preferred embodiment of the present invention. The assembly 100 consists essentially of an upper mounting plate 110, a lower mounting plate 120 and a connection assembly 130.

The mounting plate 110 provides a first connection element 112, which may be a plate or other functionally equivalent attachment for preferably mounting to the mounting bracket 18. More preferably, the connection element 112 may be in the form of a flat plate for mounting flush with the distally offset outer mounting surface 20. The threaded fasteners 22, or a lug nut 114 may be used to mount the upper mounting plate 110 beneath the tire 14 and between the tire 14 and mounting bracket 18.

The lower mounting plate 120 provides a second connection element 122, which may be a plate or other functionally equivalent attachment for preferably mounting to the stock mounting points on the tailgate for connection of the mounting bracket 18. More preferably, the second connection element 122 may be in the form of a flat plate for mounting flush with the distally offset outer mounting surface 20. The lower mounting plate 120 may further preferably include a lower extension 124 that depends from the second connection element 122 of a distance "D" sufficient to extend past the outer diameter of the mounted tire carrier 14. A lower terminus 126 of the lower extension 124 may additionally be rearwardly offset by a distance "X". Such an offset "X" may preferably be provided to accommodate the vehicle's rear bumper 16.

The connection assembly 130 may preferably provide a connection between the upper mounting plate 110 and the lower mounting plate 120. According to one exemplary embodiment as shown, the connection assembly 130 may include an upper adjustment arm 140 and a lower adjustment arm 150 mechanically affixed together by a connecting bar 160.

The upper adjustment arm 140 may be formed of an upper connector 142 securely mounted to and extending from the upper mounting plate 144. A first outer extension 144 may be removably affixed to the upper connector 142 and provides an upper extension mounting that may be position so as to clear the outer rear surface of the spare tire 14. The outer terminus 146 of the first outer extension 144 may form an upper receiver attachment 148.

The lower adjustment arm 150 may be formed of a lower connector 152 securely mounted to and extending from the lower terminus 126 of the lower extension 124. A second outer extension 154 may be removably affixed to the lower connector 152 and provides a lower extension mounting that may be position so as to clear the outer rear surface of the spare tire 14. The outer terminus 156 of the second outer extension 154 may form a lower receiver attachment 158.

According to one aspect of the present invention the upper receiver attachment 148 and the lower receiver attachment 158 may be of a similar standard size as otherwise conventional hitch receives. According to a preferred embodiment the upper receiver attachment 148 lower receiver attachment 158 may be of different sizes. According to a more preferred embodiment the upper receiver attachment 148 lower receiver attachment 158 may be of the same size.

2. OPERATION OF THE PREFERRED EMBODIMENT

In operation the swing away hitch assembly of the present invention proves an auxiliary hitch receiver attachment for use as an alternative to a vehicles standard hitch receiver. Not intended for towing but rather for light duty, such as carrying a bike rack, luggage tray or other conventionally available light duty attachments capable of mounting to a hitch receiver, the upper mount mounts to a backing plate behind the mounted spare tire, and includes an adjustable extension that may clear through a mounted spare tire, and is adjustable in order to accommodate different size tires. Similarly, a lower hitch receiver mounts to a second backing plate behind the spare tire and extending downward to clear the outer circumference of a mounted spare tire. Again, being adjustable in order to accommodate different size tires, the connecting bar may provide additional structural integrity between the upper and lower portions of the assembly.

The upper hitch receiver can receive a tray, cooler or other The lower hitch received can receive a similar accessory, or additionally a bike carrier of the type that would normally be affixed to the vehicles stock hitch receiver. With such typical aftermarket bike carrier products, bikes may be mounted in the carriers by clamping both wheels and providing some additional vertical support, by clamping the rear wheel and the front dropouts (necessitating the removal of the front wheel, which may be mounted separately on blades), or by clamping the top tube (usually in the case of rear hitch mounted carriers). There may also include a device available that connects from the stem to the seat post, to provide a top tube equivalent suitable for mounting in these carriers for step-through frame bicycles that do not have a top tube. Carriers that clamp on the front dropouts may also provide a built-in locking mechanism.

By providing a secondary mounting point or secondary mounting points for aftermarket accessories design to affix to a conventionally sized hitch receiver, the present system hereby allows for such accessories to now be mounted to in a manner that moves with the movement of the rear door, thereby allowing full functionality of the rear door and allowing attached accessories to swing out of the way to prevent blocking access thereto.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722

(2002), or other similar caselaw or subsequent precedent should not be made if any future claims are added or amended subsequent to this Patent Application.

What is claimed is:

1. A spare tire mounted, swing away bike rack for mounting to stock mounting points on a rear of a vehicle for a tire carrier comprising:
   an upper mounting plate providing a first connection element for mounting to a spare tire mounting bracket with the tire carrier in place;
   a lower mounting plate providing a second connection element, said lower mounting plate attachable to the stock mounting points and said second connection element including a lower extension that extends below an outer diameter of the mounted tire carrier; and
   a connection assembly mechanically connecting between the upper mounting plate and the lower mounting plate; and
   an auxiliary hitch receiver connection supported at the first connection element or the second connection element.

2. The spare tire mounted, swing away bike rack of claim 1, wherein the connection assembly is laterally adjustable to different distances from the rear of the vehicle.

3. The spare tire mounted, swing away bike rack of claim 1, further comprising:
   a first auxiliary hitch receiver connection support at the first connection element; and
   a second auxiliary hitch receiver connection support at the second connection element.

4. The spare tire mounted, swing away bike rack of claim 3, wherein the connection assembly is laterally adjustable to different distances from the rear of the vehicle.

5. The spare tire mounted, swing away bike rack of claim 3, wherein the second connection element has a lower terminus that is rearwardly offset to prevent mechanical interference with a rear bumper of the vehicle.

6. The spare tire mounted, swing away bike rack of claim 4, wherein the second connection element has a lower terminus that is rearwardly offset to prevent mechanical interference with a rear bumper of the vehicle.

7. In a vehicle having a hinged rear door or accessing a rear interior and a spare tire carrier externally mounted to an outer surface of the rear door, wherein the improvement comprises a hitch receiver affixed to the rear door so as to swing with the door when pivoted on the hinge, wherein the hitch receiver further comprises:
   an upper mounting plate providing a first connection element for mounting to a spare tire mounting bracket with the tire carrier in place;
   an upper adjustment arm forming an upper connector securely mounted to and extending from the first connection element,
   a lower mounting plate providing a second connection element, said lower mounting plate attachable to stock mounting points on a rear of a vehicle for a tire carrier, and said second connection element including a lower extension that extends below an outer diameter of the mounted tire carrier;
   a lower adjustment arm forming a lower connector securely mounted to and extending from a lower terminus of the lower extension;
   a connection assembly mechanically connecting between the upper mounting plate and the lower mounting plate; and
   an auxiliary hitch receiver connection supported at the first connection element or the second connection element.

8. The improvement of claim 7, said hitch receiver further comprising:
   a first auxiliary hitch receiver connection support at the first connection element; and
   a second auxiliary hitch receiver connection support at the second connection element.

9. The improvement of claim 8, wherein said first auxiliary hitch receiver connection support at the first connection element and said second auxiliary hitch receiver connection support at the second connection element each form a tube having a receiver size selected from a group consisting of: 1¼ inch; 2 inch; and 2½ inch.

10. The improvement of claim 9, wherein the first auxiliary hitch receiver connection support at the first connection element and the second auxiliary hitch receiver connection support at the second connection element have the same size.

11. The improvement of claim 9, wherein the first auxiliary hitch receiver connection support at the first connection element and the second auxiliary hitch receiver connection support at the second connection element have a different size.

* * * * *